Feb. 9, 1971  T. L. HEYING ET AL  3,562,324
CHLOROCARBORANES AND A METHOD FOR THE PRODUCTION THEREOF
Filed Nov. 27, 1964  2 Sheets-Sheet 1

◍ CARBON   ◐ BORON
○ CHLORINE  ● HYDROGEN

INVENTORS.
THEODORE L. HEYING
HANSJUERGEN A. SCHROEDER
BY Walter D. Hunter

AGENT

A

B

C

○ BORON

⊘ CARBON o HYDROGEN ON CARBON
HYDROGEN ATOMS ON
BORON OMITTED FOR
CLARITY

INVENTORS.
THEODORE L. HEYING
HANSJUERGEN A. SCHROEDER
BY
*Walter D. Hunter*

AGENT

United States Patent Office 3,562,324
Patented Feb. 9, 1971

3,562,324
CHLOROCARBORANES AND A METHOD FOR THE PRODUCTION THEREOF
Theodore L. Heying, North Haven, and Hansjuergen A. Schroeder, Hamden, Conn., assignors to Olin Corporation, a corporation of Virginia
Continuation-in-part of application Ser. No. 283,488, May 27, 1963. This application Nov. 27, 1964, Ser. No. 414,947
Int. Cl. C07f 5/02
U.S. Cl. 260—543
17 Claims

ABSTRACT OF THE DISCLOSURE

Ortho, meta and para chlorocarboranes are prepared by reacting chlorine at a temperature of about $-20°$ C. to about $+140°$ C. with ortho, meta, or para carborane in the presence of a chlorinated hydrocarbon solvent. The chlorinated carboranes of this invention are useful in the preparation of polymers suitable as fuels in solid propellant compositions.

---

This application is a continuation-in-part of co-pending application Ser. No. 283,488, filed May 27, 1963 and now abandoned.

This invention relates to novel chlorine-containing organoboranes which are useful as intermediates for the preparation of thermally stable polymers. More particularly, this invention relates to polyortho-, polymeta-, and polypara-chlorocarboranes and to a method for their preparation.

The novel ortho-chloro carboranes of this invention have the general formula:

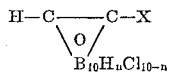

wherein $n$ is an integer of from 0 to 9 inclusive, X is chlorine or hydrogen and when $n$ is 1 to 9 inclusive, X is hydrogen. The novel meta-carboranes of this invention have the formula:

$$HCB_{10}H_nCl_{10-n}CH$$

wherein $n$ is an integer of from 0 to 9 inclusive. Para-chloro-carboranes of the same type formed when meta-carborane is employed as the carborane starting material can also be prepared by the process of this invention. The formula $HCB_{10}H_nCl_{10-n}CH$ is used in this application to represent both meta- and para-chlorocarboranes prepared by the process of this invention.

Figure 2:
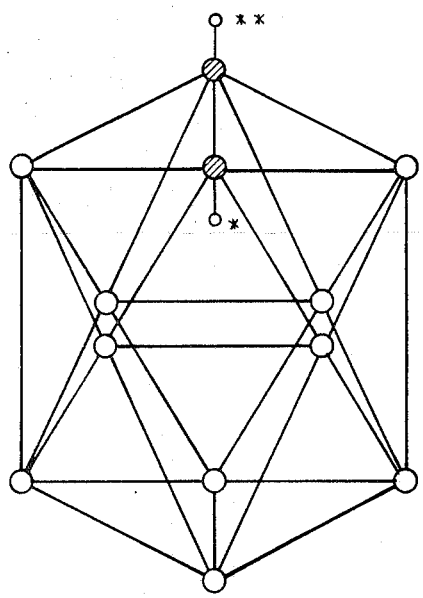
Figure 2:
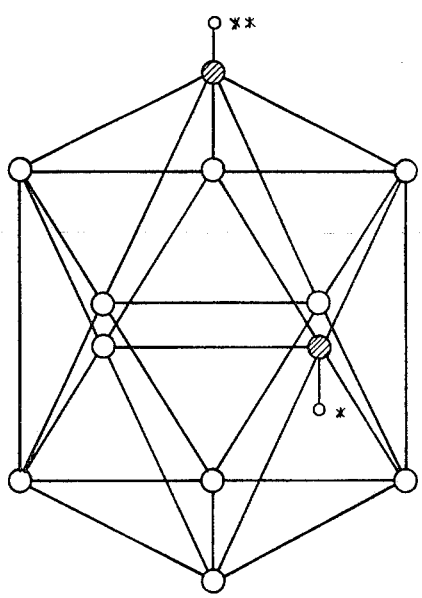
Figure 2:
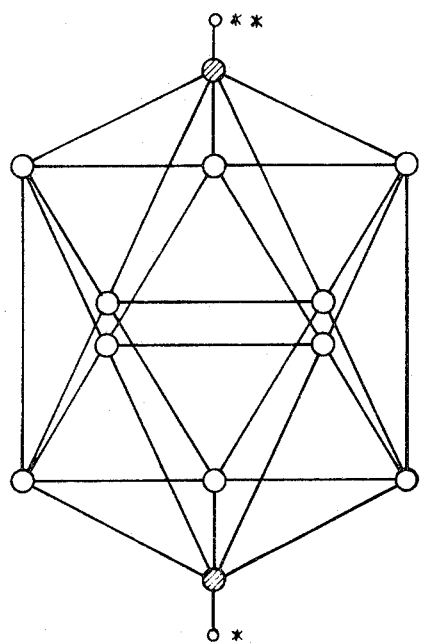

In practicing the process of this invention ortho-, meta- or para-carboranes can be employed as the starting material. In FIG. 2 the ortho-carborane which is designated by the formula:

is shown as A; the structural formula of meta-carborane, which is sometimes called neocarborane, and which is designated by the formula:

$$HCB_{10}H_{10}CH$$

is shown as B in FIG. 2 while the structural formula of para-carborane is shown as C in FIG. 2. In this specification the formula $HCB_{10}H_{10}CH$ is utilized to represent both meta- and para-carborane.

Ortho-carborane which has the formula:

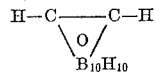

can be conveniently prepared by the process set forth in the Clark U.S. Pat. 3,062,756. For example, ortho-carborane can be prepared by reacting decarborane, diethyl sulfide and acetylene in an autoclave, at 140° C. for about 3 hours. Meta-carborane can be prepared by heating ortho-carborane in a sealed tube at a temperature above 400° C. for about 5 to 20 hours. If ortho-carborane, meta-carborane or a mixture thereof is heated in a pressure bomb at a temperature of from about 550° C. to about 630° C. for about 1 to 30 hours or more, para-carborane is obtained.

In the novel process of this invention ortho-, meta-, para-carborane or a mixture thereof is chlorinated with elementary chlorine in the presence of an inert solvent for the reactants. Useful inert solvents for the reaction include the chlorinated hydrocarbons such as carbon tetrachloride, chloroform, methylene chloride, ethylene dichloride, trichloroethylene, propylene trichloride etc.

The temperature at which the reaction is conducted can be varied widely from about $-20°$ C. to about $140°$ C. depending upon the particular reaction employed. Preferably, the reaction is conducted at the boiling point of the solvent utilized. It has been found advantageous in preparing the novel products of this invention to employ an excess of chlorine which can be conveniently introduced by simply passing it into the reaction mixture through an inlet tube at a rapid rate. Additionally, the use of ultraviolet irradiation has been found helpful in accelerating the rate of the reaction.

Although the reaction is conveniently carried out at atmospheric pressure, sub-atmospheric pressures as well as pressures up to about 5 atmospheres can be employed, if desired. The reaction takes place without the application of external heat and one of the by-products of the reaction is hydrogen chloride which is evolved from the reaction mixture. Stoichiometrically, the reaction requires that 1 gram atom of chlorine be added for each gram atom of hydrogen displaced from the carborane structure. It has been found, however, that in the reaction it is preferable to use an excess chlorine, e.g. up to about a 100 percent excess that is up to about 2 gram atoms of chlorine to each gram atom of hydrogen removed from the carborane compound.

The reaction time can likewise vary widely and generally will be from about 0.25 hour to about 10 hours or more with the preferred reaction time being from about 0.25 hour to about 5 hours.

It is of special importance that the reaction can be controlled and stopped at a certain degree of chlorine substitution in the carborane molecule. By adjusting the amount of solvent, the reaction time, the temperature applied and depending on whether or not ultraviolet light is used, the desired chlorocarborane can be obtained as the main reaction product. Purification of the crude product can be conveniently carried out by recrystallization.

It is not necessary to start with ortho-, meta-, or para-carborane itself for the preparation of the higher chlorocarboranes, since any of the lower chlorinated otho-, meta- or para-carboranes can be easily converted to a higher chlorinated product by the same chlorination procedure. Thus, a mixture of hexachloro-, octachloro- and decachloro- ortho-carboranes can be reacted with gaseous chlorine to give ortho-undecachloro-carborane in nearly quantitative yield.

The chlorocarboranes prepared by the process of this invention are extremely stable, especially those having four or more chlorine atoms. The chlorocarboranes are odorless, they have sharp melting points between about 200° C. and about 350° C., they can be stored for several months in humid air without undergoing hydrolysis, and they even remain unchanged upon treatment with boiling water.

The chlorocarborane products of this invention are useful in a wide variety of applications. The chlorocarboranes are especially useful as intermediates for the preparation of ortho-vinylcarborane-allylchoro-carborane copolymers which are useful as fuels for solid propellants. Allyl-ortho-monochlorocarborane can be prepared, for example, by reacting an ortho-chlorocarborane, such as ortho-monochlorocarborane, dissolved in diethyl ether successively with n-butyl lithium and then with allyl bromide in the manner described in Cox et al. U.S. Pat. 3,137,734. The allyl-ortho-monochlorocarborane thus prepared can be co-polymerized by the method set forth in Clark et al. U.S. Pat. 3,121,117, with ortho-vinyl carborane together with tertiary butyl peroxide in a bulk polymerization system to yield a solid copolymer useful in the preparation of solid propellant compositions (see Clark et al U.S. Pat. 3,121,117 for application details). Advantageously, they can be compounded with inert mineral fillers, such as asbestos and they can be molded under pressure to form gaskets or bushings which are suitable for use in high pressure and high temperature applications.

The process of this invention is further illustrated in the following examples which are to be considered not limitative.

EXAMPLE I

Gaseous chlorine was passed rapidly into a solution of ortho-carborane (2.88 g., 0.02 mole) in carbon tetrachloride (100 ml.) irradiated with an ultraviolet light. The evolution of hydrogen chloride commenced at once and the observed exothermic reaction raised the temperature to approximately 60°, whereupon the chlorination was abruptly stopped. After filtration, the solvent was removed to give a solid residue which was fractionally recrystallized from high-boiling (66–90° C.) and low-boiling (30–60° C.) petroleum ether to yield 0.8 g. (19 percent of the theoretical amount) of ortho-dichlorocarborane,

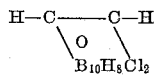

(M.P. 232° C.) and 1.4 g. (32 percent of the theoretical amount) of ortho-dichlorocarborane, M.P. 250–51° C.

Calc'd for $C_2H_{10}B_{10}Cl_2$ (percent): C, 11.26; H, 4.73; B, 50.75; Cl, 33.25. Found (M.P. 232° C.) (percent): C, 11.52; H, 4.85; B, 49.80; Cl, 32.35. Found (M.P. 250–251° C.) (percent): C, 11.21; H, 4.40; B, 50.70; Cl, 32.80.

EXAMPLE II

Gaseous chlorine was bubbled into a solution of 5 g. of ortho-carborane in 150 ml. of carbon tetrachloride exposed to an ultraviolet lamp. An exothermic reaction raised the temperature to 58° C., but then began to subside. The chlorination was continued for an additional 5 minutes. The reaction mixture was evaporated to dryness, and the residue consisting of a mixture of

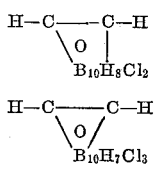

and

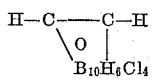

yielded on several recrystallizations from petroluem ether (66–90° C.) /n-heptane (1:1) ortho-tetra chlorocarborane, M.P. 250° (25 percent of the theoretical quantity), as the least soluble component.

Calc'd for $C_2H_8B_{10}Cl_4$ (percent): C, 8.52; H, 2.86; B, 38.35; Cl, 50.27. Found (percent): C, 8.85; H, 3.10; B, 38.30; Cl, 49.80.

EXAMPLE III

A moderate stream of gaseous chlorine was passed through a refluxing solution of ortho-carborane (4 g.) in carbon tetrachloride (160 ml.) with ultraviolet irradiation. After approximately 15 minutes a white solid began to separate and the reaction was discontinued. After cooling to 30° the solid was removed and recrystallized from chloroform (1 g. per 35 ml.) to give 4.1 g. (52 percent of the theoretical quantity) of ortho-tetrachlorocarborane,

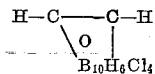

M.P. 351° C.

Calc'd for $C_2H_8B_{10}Cl_4$ (percent): C, 8.52; H, 2.86; B, 38.35; Cl, 50.27. Found (percent): C, 8.61; H, 2.90; B, 38.20; Cl, 50.78.

The filtrate of the above reaction was evaporated and the remaining solid was recrystallized from petroleum ether (66–90°) to give 2 g. (13.8 percent of the theoretical quantity) of ortho-trichlorocarborane,

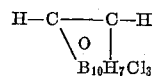

M.P. 241–43° C.

Calc'd for $C_2H_9B_{10}Cl_3$ (percent): C, 9.70; H, 3.66; B, 43.69; Cl, 42.95. Found (percent): C, 10.40; H, 3.84; B, 42.36; Cl, 43.11.

EXAMPLE IV

Into a solution of 8 g. of ortho-carborane in 600 ml. of refluxing carbon tetrachloride there was passed a rapid stream of chlorine gas. A precipitate formed after approximately 25 minutes but chlorination was continued until this solid began to redissolve. The reaction mixture was cooled to 0° C. to give 16.5 g. of crude ortho-hexachlorocarborane, M.P. 290–95° C. Recrystallization from carbon tetrachloride (1 g. per 70 ml.) gave pure ortho-hexachlorocarborane,

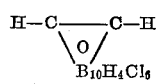

(79 precent of the theoretical quantity), M.P. 306° C.

Calc'd for $C_2H_6B_{10}Cl_6$ (percent): C, 6.84; H, 1.72; B, 30.83; Cl, 60.61 Found (percent): C, 6.92; H, 1.98; B, 30.60; Cl. 61.15.

EXAMPLE V

Gaseous chlorine was passed rapidly into a refluxing solution of 8 g. of ortho-carborane in 600 ml. of carbon tetrachloride irradiated with an ultraviolet lamp. A precipitate separated after 15 minutes but chlorination was continued until the solid had completely redissolved to give a clear solution. After an additional period of chlorination (about 20 minutes) the formation of a distinct haze was observed whereupon the hot solution was immediately filtered. Cooling of the filtrate precipitated 16 g. of practically pure

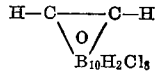

Additional crude product was recovered by evaporating the solvent. Recrystallization from carbon tetrachloride (1 g. per 40 ml.) gave a total of 19 g. (81.5 percent of the theoretical quantity) of ortho-octachlorocarborane, M.P. 272° C.

Calc'd for $C_2H_4B_{10}Cl_8$ (percent): C, 5.72; H, 0.96; B, 25.77; Cl, 67.55. Found (percent): C, 5.85; H, 1.54; B, 25.80; Cl, 68.33.

EXAMPLE VI

The procedure as described in Example V was repeated employing an amount of 20 g. of ortho-carborane in 1500 ml. of carbon tetrachloride. Ortho-octachlorocarborane was obtained in high purity in 82 percent yield.

EXAMPLES XIV–XVII

Several experiments were conducted in the same manner as described in Example XIII using ortho-decachlorocarborane, ortho-octachlorocarborane, ortho-hexachlorocarborane or a mixture thereof, as starting material. The relevant data are summarized in the following table:

| Example | Starting material (grams) | CCl$_4$ (ml.) | Yield of ortho-undecachlorocarborane | |
|---|---|---|---|---|
| | | | Grams | Percent of the theoretical quantity |
| XIV | Ortho-decahlorocarborane (30) | 1,500 | 27.4 | 85.5 |
| XV | Ortho-octachlorocarborane (25) | 1,500 | 27.0 | 87 |
| XVI | Ortho-hexachlorocarborane (20) | 1,500 | 25.4 | 85 |
| XVII | Ortho-decachlorocarborane (10) Ortho-octachlorocarborane (10) Ortho-hexachlorocarborane (10) | 1,750 | 33.2 | 87.5 |

EXAMPLE VII

Ortho-carborane (17 g.) in carbon tetrachloride (1700 ml.) was chlorinated as described for the preparation of ortho-octachlorocarborane. After the haze became apparent, chlorination was continued for approximately 30 minutes. The hot reaction mixture was filtered, and from the filtrate 42 g. of product separated upon cooling to 5°. evaporation of the filtrate gave another 13 g. of product. Repeated recrystallization of the combined yield from carbon tetrachloride (1 g. from 15–20 ml.) gave fractions, the infrared spectra and melting points of which were carefully examined. Total yield of pure orthodecachlorocarborane

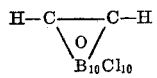

was 42 g. (73 percent of the theoretical yield), M.P. 259° C.

Calc'd for $C_2H_2B_{10}Cl_{10}$ (percent): C, 4.91; H, 0.41; B, 22.14; Cl, 72.54. Found (percent): C, 4.98; H, 0.90; B, 22.30; Cl, 72.48.

EXAMPLES VIII–XII

A number of experiments was performed in the same manner as described in Example VII. Pertinent data relating to these experiments are compiled in the following Table.

| Example | Ortho-carborane (grams) | Carbon tetrachloride (amount in ml.) | Yield of ortho-decachlorocarborane | |
|---|---|---|---|---|
| | | | Grams | Percent of theoretical quantity |
| VIII | 17 | 1,300 | 32 | 55.5 |
| IX | 17 | 1,500 | 38 | 66 |
| X | 17 | 1,700 | 41.2 | 71.6 |
| XI | 17 | 1,700 | 40.4 | 70.4 |
| XII | 25 | 2,500 | 61 | 72 |

EXAMPLE XIII

Ortho-decachlorocarborane (30 g.) in refluxing carbon tetrachloride (1500 ml.) was treated with a rapid stream of gaseous chlorine for 4 hours in the presence of ultraviolet light. The hot reaction mixture was filtered and when the filtrate was cooled to 0°, 26 g. of pure ortho-undecachlorocarborane precipitated. Evaporation of the filtrate gave additional product which was purified by recrystallization from CCl$_4$ (1 g. per 25 ml.). Total yield of pure ortho-undecachlorocarborane,

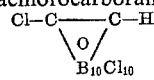

was 29 g. (90.5 percent of the theoretical quantity); M.P. 279° C.

Calc'd for $C_2HB_{10}Cl_{11}$ (percent): C, 4.59; H, 0.19; B, 20.68; Cl, 74.54. Found (percent): C, 4.55; H, 0.50; B, 20.50; Cl, 74.42.

EXAMPLE XVIII

A stream of gaseous chlorine was passed through a refluxing solution of 8 g. of ortho-carborane in 600 ml. of chloroform for 4 hours with ultraviolet irradiation. There was no precipitate formed. Upon ice-cooling a white solid separated and more of it was obtained upon concentration of the reaction mixture. By mass spectral analysis the reaction product was proved to be a mixture of ortho-hexachlorocarborane (55 percent, M.P. 306° C.) and ortho-heptachlorocarborane (45 percent, M.P. 289° C.), and was separated by repeated fractional recrystallization from heptane. The refraction index of the refraction index of the recovered solvent indicated that the chloroform had been converted to carbon tetrachloride.

EXAMPLE XIX

Gaseous chlorine was passed at a rapid rate into a refluxing solution of 15 g. of meta-carborane in 1500 ml. of carbon tetrachloride for 3 hours. The reaction mixture was filtered and evaporated to dryness to give 50 g. of crude material. Purification by recrystallization from petroleum ether (B.P. 66°–90°) gave 47.5 g. (93 percent) of pure decachloroneocarborane, $$HCB_{10}Cl_{10}CH$$

M.P. 235–236° C.

*Analysis.*—Calc'd for $C_2H_2B_{10}Cl_{10}$ (488.8) (percent): C, 4.91; H, 0.41; B, 22.14; Cl, 72.54. Found (percent): C, 4.95; H, 0.50; B, 22.15; Cl, 72.65. Mol. weight, 492.0.

Figure 1:
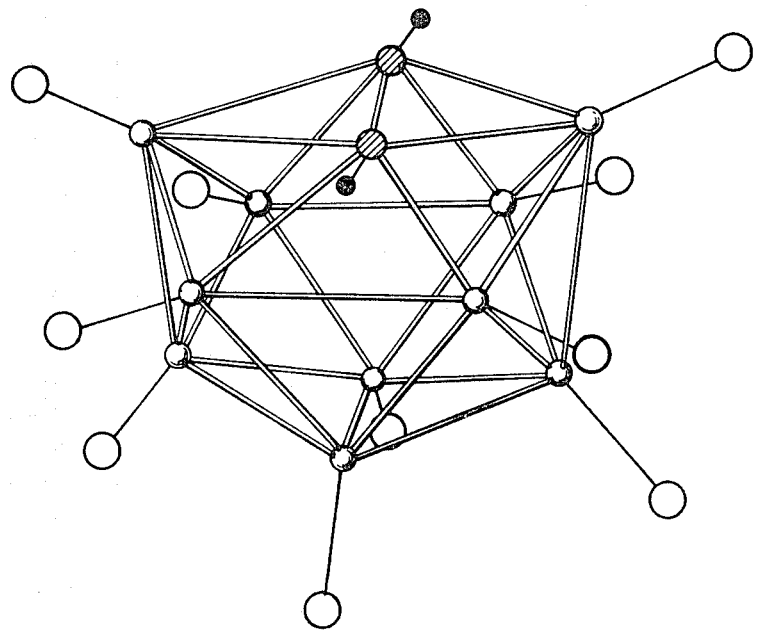

The structural formula of the compound:

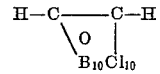

prepared as described in Example VII is shown in FIG. 1 which follows.

What is claimed is:
1. Compounds of the formula:

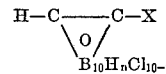

and of the formula:

$$HCB_{10}H_nCl_{10-n}CH$$

wherein X is chlorine or hydrogen and $n$ is an integer of from 0 to 9 inclusive and with the proviso that when $n$ is 1 to 9 inclusive, then X is hydrogen.

2. A compound of the formula:

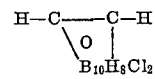

having a melting point of approximately 250–51° C.

3. A compound of the formula:

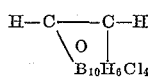

having a melting point of approximately 351° C.

4. A compound of the formula:

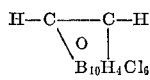

having a melting point of approximately 306° C.

5. A compound of the formula:

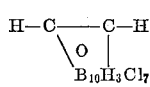

having a melting point of approximately 289° C.

6. A compound of the formula:

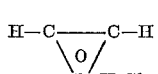

having a melting point of approximately 272° C.

7. A compound of the formula:

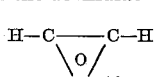

having a melting point of approximately 259° C.

8. A compound of the formula:

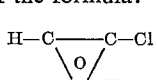

having a melting point of approximately 279° C.

9. A compound of the formula:

$HCB_{10}Cl_{10}CH$ having a melting point of approximately 235° C.

10. A method for the preparation of a chlorocarborane compound which comprises reacting chlorine with a compound selected from the group consisting of:

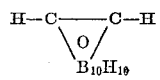

and $HCB_{10}H_{10}CH$ in the presence of an inert organic solvent.

11. The method of claim 9 wherein the reaction carried out at a temperature between about $-20°$ C. and about $+140°$ C.

12. The method of claim 9 wherein the inert organic solvent is a chlorinated hydrocarbon.

13. The method of claim 10 wherein the said compound is:

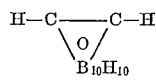

14. The method of claim 10 wherein the said compound is:

$HCB_{10}H_{10}CH$

15. The method of claim 9 wherein the inert organic solvent is carbon tetrachloride.

16. The method of claim 9 wherein the inert organic solvent is chloroform.

17. The method of claim 9 wherein the reaction is carried out in the presence of ultraviolet light.

References Cited

Schroeder et al.: Inorganic Chemistry, vol. 2, pp. 1092–1096 (1963).

LORRAINE A. WEINBERGER, Primary Examiner

E. J. GLEIMAN, Assistant Examiner

U.S. Cl. X.R.

149—109; 204—158